US006556724B1

(12) United States Patent
Chang et al.

(10) Patent No.: US 6,556,724 B1
(45) Date of Patent: Apr. 29, 2003

(54) METHODS AND APPARATUS FOR RESOLUTION INDEPENDENT IMAGE COLLABORATION

(75) Inventors: Paul Joseph Chang, Allison Park, PA (US); John C. Huffman, Menlo Park, CA (US); Bradford V. Hebert, Piedmont, CA (US)

(73) Assignees: Stentor Inc., Brisbane, CA (US); University of Pittsburgh, Pittsburgh, PA (US)

( * ) Notice: Subject to any disclaimer, the term of this patent is extended or adjusted under 35 U.S.C. 154(b) by 0 days.

(21) Appl. No.: 09/449,112

(22) Filed: Nov. 24, 1999

(51) Int. Cl.$^7$ .............................. G06K 9/54; G09G 5/00; H04N 7/14; G06F 17/24
(52) U.S. Cl. ...................... 382/299; 382/305; 382/298; 382/128; 345/1.2; 345/3.3; 348/14.12; 707/526; 707/516
(58) Field of Search ................................ 382/299, 282, 382/303, 305, 309, 284, 132, 131, 130, 128; 345/1.2, 3.3, 2.1, 2.2, 698, 699; 348/14.12, 208.3, 333.11; 707/6, 8, 9, 10, 516, 526

(56) References Cited

U.S. PATENT DOCUMENTS

| | | | |
|---|---|---|---|
| 5,528,704 A | * | 6/1996 | Parker et al. ............... 382/299 |
| 5,539,658 A | | 7/1996 | McCullough |
| 5,544,291 A | * | 8/1996 | Gilley et al. ................ 345/423 |
| 5,745,666 A | * | 4/1998 | Gilley et al. ................ 345/428 |
| 5,940,082 A | * | 8/1999 | Brinegar et al. ............ 345/442 |
| 6,195,091 B1 | * | 2/2001 | Harple et al. ............... 345/330 |
| 6,209,021 B1 | * | 3/2001 | Ahimovic et al. .......... 709/204 |

FOREIGN PATENT DOCUMENTS

| | | |
|---|---|---|
| EP | 0 701 375 A2 | 8/1994 |
| EP | 0 669 765 A2 | 8/1995 |

OTHER PUBLICATIONS

Richard L. Phillips, "A Bridge from Full–Functon to Reduced–Function Workstations", I.E.E.E. Computer Graphics and Application 6, May (1986) NY, NY.

* cited by examiner

Primary Examiner—Bhavesh Mehta
Assistant Examiner—Yosef Kassa
(74) Attorney, Agent, or Firm—Stattler Johansen & Adeli, LLP

(57) ABSTRACT

An image collaboration system conducts resolution independent image collaboration among a host computer and participating client computers. The subject of the image collaboration involves at least one source image. The source image is transformed into a hierarchical representation, such that each level of the hierarchical representation is sufficient to reconstruct the source image at a given resolution. The host computer displays, at a first resolution, an image based on one or more of the source images. To conduct the resolution independent image collaboration, the host computer generates a resolution independent description of the image, which describes the first display image relative to the source image, and broadcasts the resolution independent description of the image to the participating clients. In response, the participating clients generate an image from the resolution independent description of the image at the host computer at a resolution sufficient for display at the participating clients. Resolution independent image collaboration for use in a medical informatics system is also disclosed.

17 Claims, 13 Drawing Sheets

Source Image

METHODS AND APPARATUS FOR RESOLUTION INDEPENDENT IMAGE COLLABORATION

BACKGROUND OF THE INVENTION

1. Field of the Invention

The present invention is directed towards the field of image distribution, and more particularly towards conducting image collaboration among computers that display the image at potentially different resolutions.

2. Art Background

It has become more common in the medical field for images to be stored, distributed, and viewed in digital form using computer technology: Currently, Picture Archival and Communication Systems or PACS have been in widespread use. In a typical PACS application, image data obtained by imaging equipment such as CT scanners or MRI scanners are stored in the form of computer data files. The size of a data file for an image varies depending on the size and resolution of the image. For example, a typical image file for a diagnostic-quality chest X-ray is on the order of 10 megabytes (MB). The image data files are usually formatted in a "standard" or widely accepted format. In the medical field, one widely used image format is known as DICOM. The DICOM image data files are distributed over computer networks to specialized viewing stations capable of converting the image data to high-resolution images on a CRT display.

In general, collaboration involves the collective participation of two or more people regarding a subject. The subject of the collaboration may involve any type of problem or case, or it may involve the presentation of information for purposes of learning. In the past, a collaboration required people to assemble in a common geographical location to conduct the collaboration. However, with advancements in computers and telecommunications, collaboration among remote users may be conducted using some form of image based conferencing. Image collaboration generally refers to the collective participation of two or more people viewing a common image or portions of a common image. Typically, to conduct image collaboration among computers, the computer hosting the collaboration, referred to herein as the host computer, transmits the image to each of the one or more participating client computers.

Image collaboration has application for use in medical imaging or medical informatics. For this application, a physician conducting the image collaboration may use digitized medical images (e.g., mammogram, X-Ray, MRI, CATSCAN, etc.) to discuss a particular medical case with one or more physicians. For example, a primary care physician may seek to collaborate over a medical case with a specialist by pointing out to the specialist participating in the collaboration particular characteristics exhibited in a patient's X-Ray.

Although computers are ubiquitous in both home and office, the characteristics (e.g., screen resolution, processor speed, etc.) of different computers are typically different. For example, a notebook computer may contain a monitor capable of displaying images at a relatively low resolution, whereas a desktop computer may contain a high-resolution 19 in. monitor. Prior art image collaboration systems typically require all of the participants in the collaboration to have the same computer equipment. Thus, in the medical imaging application, each physician is required to use the same proprietary computer workstation in order to participate in the collaboration. For example, in the medical imaging application, a radiologist may have access to a high-resolution workstation in the radiology department, while a physician, participating in the medical collaboration, may only have access in his office to a personal computer ("PC"), with relatively low resolution. A third physician traveling, who wishes to participate in the medical collaboration, may only have access to a notebook computer. As illustrated by this example, all three physicians have three different screen resolutions, although desire to collaborate over the same image. This limitation severely inhibits the widespread use of image collaboration. Therefore, it is desirable to develop a system that permits image collaboration independent of the display resolution of the participants. It is also desirable to develop an image collaboration system for medical applications, which requires distribution of large data files that requires only the use of thin clients.

SUMMARY OF THE INVENTION

An image collaboration system conducts resolution independent image collaboration among a host computer and participating client computers. The subject of the image collaboration involves at least one source image. The source image is stored so as to permit construction of at least portions of the source image at different resolutions. In one embodiment, the source image is transformed into a dynamic transfer syntax representation, also referred to herein as pyramidal data structure. In general, the pyramidal data structure comprises a hierarchical representation of the source image, wherein each level of the hierarchical representation is sufficient to reconstruct the source image at a given resolution.

After establishing communications for the image collaboration session, the host computer displays, at a first resolution, a display image based on one or more of the source images. To conduct the resolution independent image collaboration, the host computer generates a resolution independent description of the first display image that describes the first display image relative to the source image. In one embodiment, the resolution independent language describes a center point of the image displayed, as well as the dimensions of the image. The host computer broadcasts the resolution independent description of the first display image to the participating clients. In response, the participating clients generate an image from the resolution independent description of the image at the host computer at a resolution sufficient for display at the participating clients.

The image collaboration system has application for use in a medical informatics system. In one embodiment, the medical informatics system includes a user interface with a patient browser view and a patient canvas view. The patient browser view permits the user to select studies for the collaboration session. The patient canvas view provides the user the flexibility to arrange the studies, including the images and series within the studies, in any manner desired. The image collaboration system then broadcasts, in the resolution independent description, the entire screen display of the host to provide full context of the host computer display to the participating clients.

BRIEF DESCRIPTION OF THE DRAWINGS

FIG. 3b illustrates level three and level four decompositions for the 4K×4K source image of FIG. 3a.

DETAILED DESCRIPTION

Image Collaboration Overview

Figure 1:
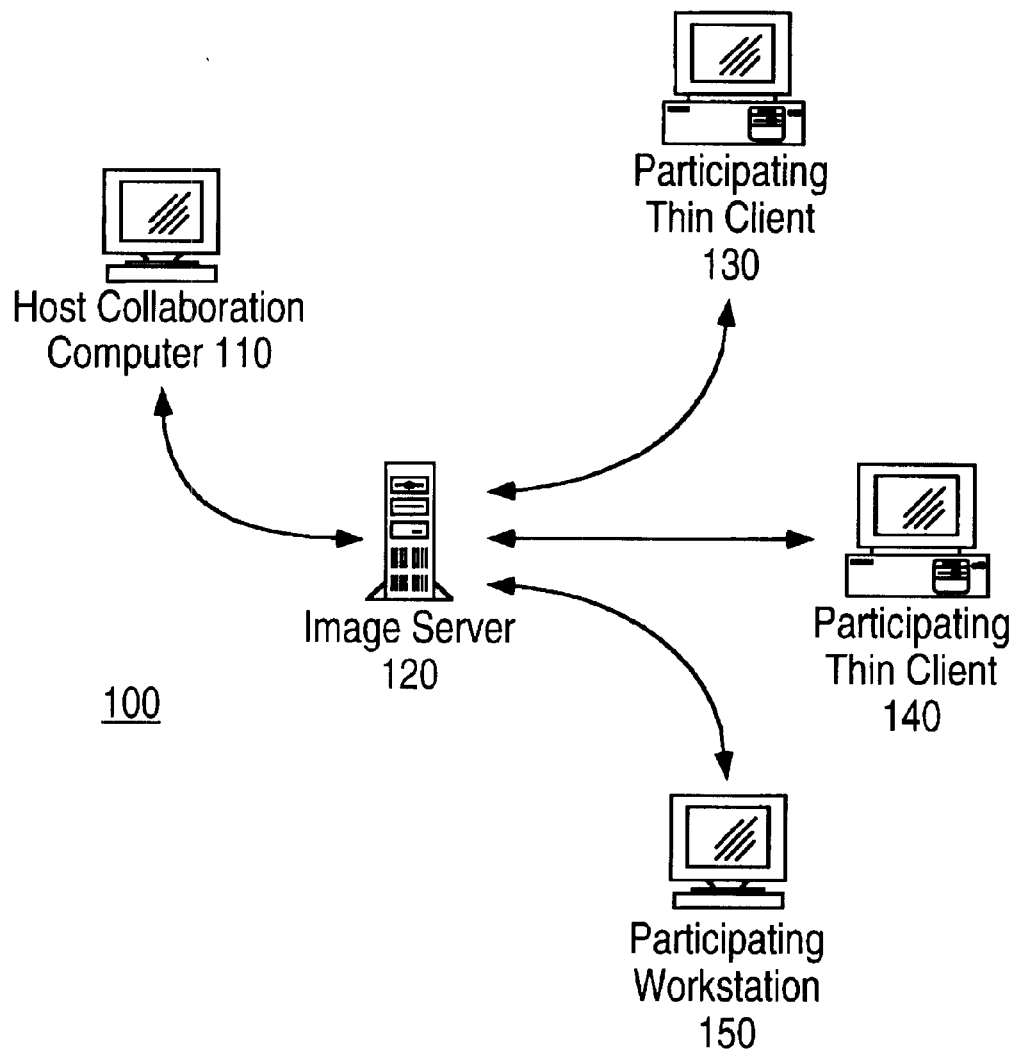
FIG. 1 illustrates one embodiment for the image collaboration system of the present invention.

FIG. 1 illustrates one embodiment for the image collaboration system of the present invention. For this embodiment, the image collaboration system 100 includes a host collaboration computer 110, and several participating clients (i.e., participating thin client 130, participating thin client 140, and participating workstation 150). For this embodiment, the host and participating clients 130, 140 and 150 communicate through image server 120. As used herein, a thin client is a computer with limited resources, such as limited network bandwidth and/or display resolution. For example, a thin client may consist of a personal computer ("PC") or a network computer. A thick client, such as participating client 150, may comprise a workstation or a high-end personal computer with more robust computing resources. For example, the participating client 150 may consist of a workstation with a high-resolution monitor (e.g., 1600×1200 pixels) to permit viewing of large images.

The image collaboration system 100 permits collaborating among computers with different display resolutions. For the embodiment shown in FIG. 1, the host collaboration computer 110 and participating client computers 130, 140 and 150 comprise one or more different display resolution capabilities. For example, the host collaboration computer 110 may comprise a monitor capable of displaying 1280× 1024 pixels, whereas the participating thin client 130 may only be capable of displaying 640×480 pixels. Thus, the computers need not be compatible in order to participate in image collaboration.

As described more fully below, the image collaboration system of the present invention has application for use in medical imaging. For example, in the medical imaging application for image collaboration, a radiologist working on a high-resolution workstation in the radiology department of a hospital may collaborate on a medical image with a physician working on a standard personal computer at the physician's office. The ability to conduct image collaboration with computers that have different resolutions greatly expands the usefulness and applicability of image collaboration applications.

In general, image collaboration involves a host computer, operated by a host user, propagating or broadcasting an image description, or a description of a series of images, to one or more participating clients. For example, in the medical imaging application, a referring physician may host a collaboration among one or more physicians to consult on a specific medical case. In one embodiment, the host of the collaboration sets-up a session that defines the participants of the collaboration. Regardless of the application, the host computer begins the collaboration session by specifying an image. Depending upon the embodiment, the host broadcasts information about the image, either directly or indirectly, to the participating clients (e.g., participating clients 130, 140, and 150 in FIG. 1). For the embodiment of FIG. 1, the host collaboration computer 110 broadcasts information about the image through image server 120, and the image, or information about the image, is transferred to the participating clients.

During the image collaboration session, the host may desire to point out particular features of the image. To this end, the host may use a cursor control device to point to a particular area on the image. This cursor control position is then broadcast, along with the description of the image coordinates, to the participating clients so that the clients may follow the host through several iterative steps while the host interacts with the image. In one embodiment using a dynamic transfer syntax described below, the host may interact with a source image, including large images, to pan and zoom portions of the source image during the collaboration session. Also, in the medical imaging application, the host physician may describe a particular condition in conjunction with pointing to a portion of a patient's X-ray. Each movement of the cursor may constitute a new image that is broadcast to the participating clients. In other embodiments, the image, as the subject of the collaboration, may be broadcasted from the host computer to the participating clients upon any predetermined condition without deviating from the spirit or scope of the invention. For example, the host may input, through a cursor control device or keyboard, an indication to broadcast the current screen display at the host to the participating clients. In other embodiments, the active display of the host may be periodically updated.

The image collaboration system of the present invention may operate in conjunction with audio. For this embodiment, the host and the clients, through the host computer and participating client computers, may exchange audio information to generate a verbal dialogue to accompany the series of images. The distribution of audio among computers in a network environment is well known in the art.

In a preferred embodiment, the host collaboration computer may manipulate the image in any manner. Specifically, the host collaboration computer 10 may perform zoom and pan functions with the image. One embodiment for manipulating large images using a dynamic transfer syntax is described more fully below. For example, in the medical imaging application, the host physician may conduct a collaboration session with a large X-ray (e.g., 10 mega byte (MB) file). For this example, the physician may start with a low-resolution view of the entire image. As the session proceeds, the host physician may zoom in on particular features of the X-Ray. Through use of these pan and zoom functions, the host physician may present to the participating physicians, through a series of images, a complicated analysis of the X-ray while the participating physicians receive the images generated at the host computer. Accordingly, the ability to efficiently manipulate large images during image collaboration for such applications such as medical imaging, is greatly enhanced.

A Dynamic Transfer Syntax for Image Distribution

Figure 2:
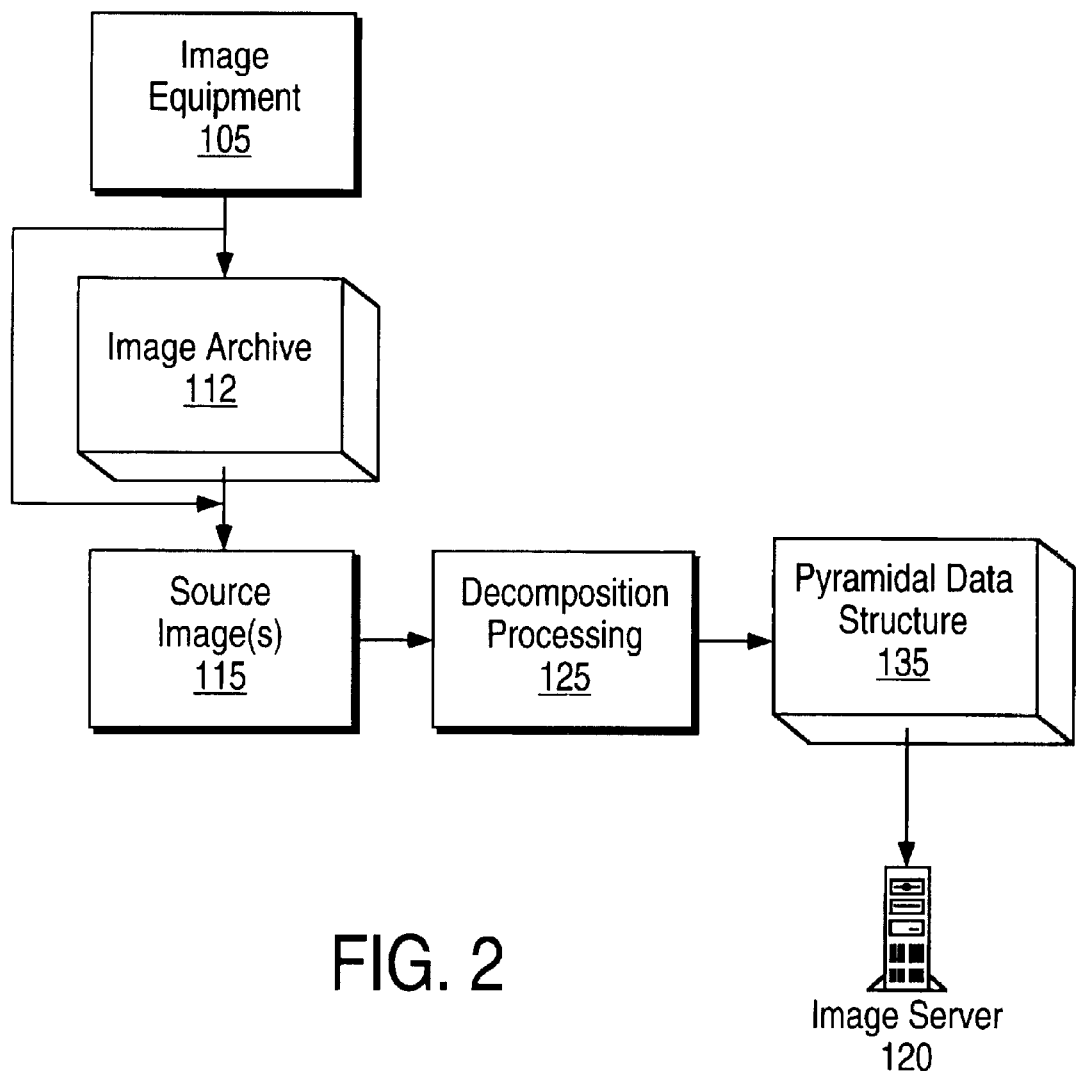
FIG. 2 illustrates one embodiment for a system that employs dynamic transfer syntax for use in image collaboration.

FIG. 2 illustrates one embodiment for a system that employs dynamic transfer syntax for use in image collaboration. For this embodiment, a dynamic transfer syntax system 102 optionally includes imaging equipment 105 to generate source images 115 for storage in electronic form in an image archive 112. The image archive 112 contains electronic storage components such as disk drives and tape drives used to store the images in a highly reliable manner. The images are stored in a suitable archival format, such as the above-mentioned DICOM format. The imaging equipment 105 includes any type of equipment to generate images, including medical equipment (e.g., X-ray equipment, CT scanners, and MR scanners).

For this embodiment, the dynamic transfer syntax system 102 includes at least one image server 120. As shown in FIG. 1, the image server 120 is coupled to the host collaboration computer 110, as well as participating clients 130, 140 and 150. The source image 115 is processed, by decomposition processing, 125, to generate a pyramidal data structure 135. For this embodiment, the server 120 transmits to the host collaboration computer 110 and clients 130, 140 and 150 transformations of the source image 115 ("transform data"), stored as pyramidal data structure 130, to re-create images and sub-images in the computers. The dynamic transfer syntax system 102 transfers only the coefficient data required to reconstruct a requested image at the client(s), thus implementing a "just in time" data delivery system. The techniques of the dynamic transfer syntax system permit use of a network with moderate bandwidth capacity, while still providing low latency for transfer of large data files from the image server 120 to computers 110, 130, 140 and 150. For example, the network in the image collaboration system 100 (FIG. 1) may utilize an Ethernet (10baseT) medium or an ISDN transmission medium. Regardless, any network, including wide area networks (WANs) and local area networks (LANs) may be used with the image collaboration system without deviating from the spirit and scope of the invention.

The dynamic transfer syntax system 102 processes one or more source images 115. Generally, the source image 115 comprises any type of a large data file for transfer over a network environment. In one medical imaging application, the source image 115 includes a digitized medical image generated from medical instrumentation (e.g., mammogram, X-Ray, MRI, CATSCAN, etc.). Although the present invention is described for use in collaborating with medical images, any large data file may be used as a source image 115 without deviating from the spirit or scope of the invention.

As shown in FIG. 2, the source image(s) 115 are input to decomposition processing 125. In general, decomposition processing 125 transforms the source images 115 into the dynamic transfer syntax representation, also referred to herein as pyramidal data structure 135. In general, the pyramidal data structure 135 comprises a hierarchical representation of the source image. Each level of the hierarchical representation is sufficient to reconstruct the source image at a given resolution. In one embodiment, the decomposition processing 125 utilizes a sub-band decomposition to generate the hierarchical representation. In general, sub-band decomposition consists of executing a process to separate "high-pass" information from "low-pass" information. For the sub-band decomposition embodiment, decomposition processing 125 comprises a finite impulse response (FIR) filter.

In one embodiment that uses sub-band decomposition, the decomposition processing 125 uses wavelet transforms, which are a sub-class of the sub-band decomposition transform. In general, the wavelet transform may be selected so that the kernels aggregate a sufficient amount of the image information into the terms or coefficients. Specifically, the information is aggregated into the "low low" component of the decomposition. In one embodiment, kernels of the wavelet transform are selected so as to balance the computational efficiency of the transform with optimization of the aggregate information in the low pass components. This characteristic of wavelet transforms permits transfer, and subsequent display, of a good representation of the source image at a particular resolution while maintaining the computational efficiency of the transform.

The wavelet transform function embodiment generates mathematically independent information among the levels of the hierarchical representation. Accordingly, there is no redundant information in the pyramidal data structure 135. Thus, pyramidal data structure 135 is not merely multiple replications of the source image at different resolutions, which consists of redundant information, but it contains unique data at the different levels of the hierarchical representation. The mathematically independent nature of the wavelet transform permits minimizing the amount of data transferred over a network, by requiring only the transfer of "additional data" not yet transferred to the computer from the server necessary to construct a given image. The wavelet transforms are lossless, in that no data from the original source image is lost in the decomposition into the pyramidal data structure 135. Accordingly, the dynamic transfer syntax system has applications for use in medical imaging and medical imaging applications.

In one embodiment, fixed point kernels are used in the wavelet transform (i.e., decomposition processing 125). The use of fixed point kernels generates coefficients for the pyramidal data structure that permit an easy implementation into a standard pixel footprint. The wavelet transform, a spatial transform, generates a dynamic range of the "low low" component that is equal to the dynamic range of the source image. Because of this characteristic, the "low low" component does not contain overshoot or undershoot components. As a result, the use of fixed point kernels is preferred because no normalization process to convert the transformed dynamic range to the pixel dynamic range is required.

For this embodiment, the dynamic transfer syntax system 102 directly utilizes the transform coefficients as pixels, without re-scaling the coefficients. The range of the high-pass components (i.e., "low high", "high low", and "high high" components) is the range of the input source data plus up to four bits per coefficient (e.g., 2 bits). This characteristic permits mapping of all components (i.e., high and low pass components) to a given pixel footprint.

The use of the wavelet transform to generate the pyramidal data structure provides a scalable solution for transferring different portions of a large data file. When the source image 115 is decomposed into the pyramidal data structure 135, sub-images and sub-resolution images are extracted directly from memory of the image server. The image server then transmits only the data, in the form of physical coefficients, required to reconstruct the exact size of the desired image for display at the client. Accordingly, the multi-resolution format is implicit in the pyramidal data structure.

A wavelet transform is a spatial transform. In general, in a spatial transform, the information is aggregated so as to preserve the predictability of the geometry of the source image. For example, using a wavelet transform with fixed point kernels, specific coefficients of the transform data may be identified that contribute to specific geometric features of the source image (i.e., a pre-defined portion of a source image is directly identifiable in the transform data). In another embodiment, the wavelet transforms use floating point kernels.

In other embodiments, the wavelet transform may be used to generate multi-spectral transform data. In general, multi-spectral transform data aggregates multi-components of the source image into a vector for the transform data. Through use of multi-spectral transform data, the wavelet transform may aggregate multi-dimensional data (e.g., two dimensional, three dimensional, etc.) for a source image. For example, multi-dimensional transform data may be used to reconstruct a source image in three dimensions. Also, the multi-spectral transform data may comprise any type of attribute for binding to the source image, such as color variations and/or non-visual components (e.g., infrared components).

In general, to generate the pyramidal data structure 135, the transform is applied across the columns, and then this transform, or a different transform, is applied across the rows. The selection of the transform for decomposition processing 125 is dependent upon the particular characteristics of the pyramidal data structure desired. Each level of the pyramidal data structure is generated by recurring on the low-pass, "low low", of the previous higher level. This recursion continues until a predetermined size is obtained. For example, in one embodiment, the lowest level in the pyramidal data structure for a source image having an aspect ratio of one-to-one consists of a low-pass component of 128×128. However, any granularity of resolution may be generated for use in a pyramidal data structure without deviating from the spirit or scope of the invention. Also, any quadrant may be used in the recursion process with any desired transform.

Figure 3B:
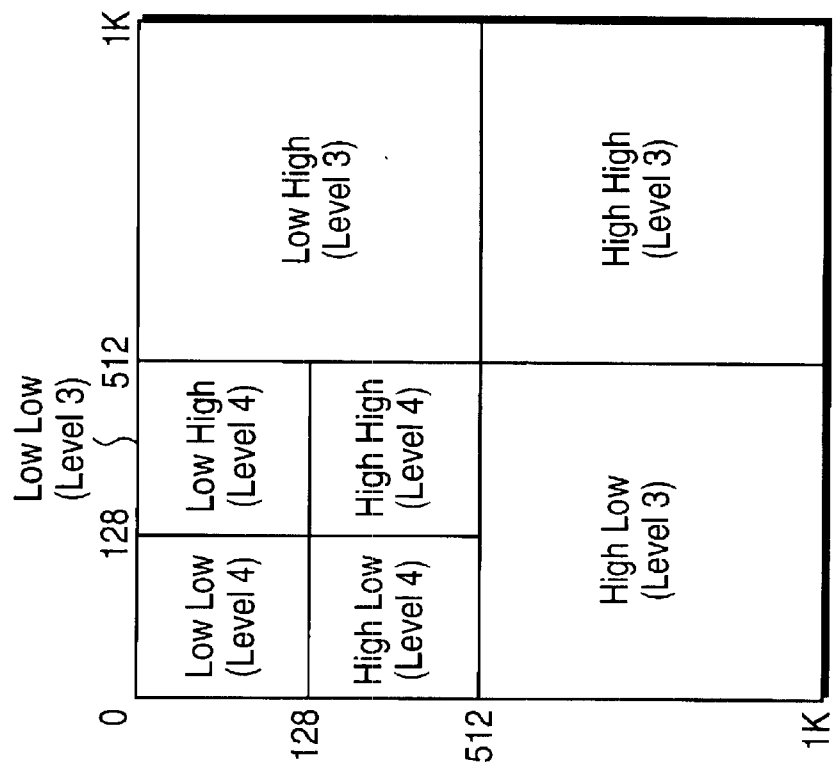
Figure 3A:
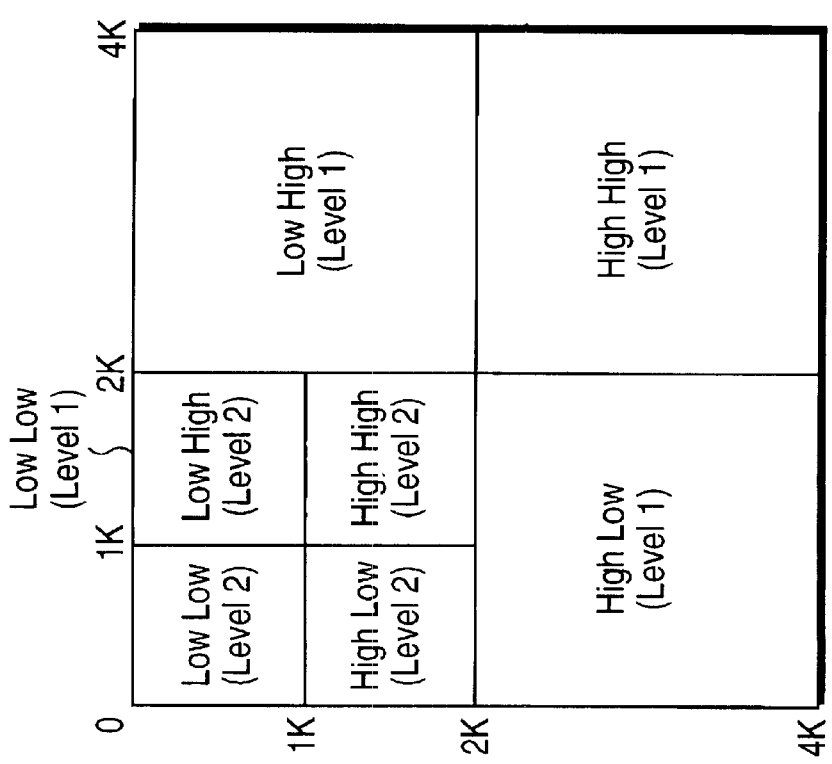
FIG. 3a illustrates an example of a pyramidal data structure.

FIG. 3a illustrates an example of a pyramidal data structure. For this example, the source image comprises a 4K×4K image. The decomposition processing 125 generates, in a first iteration, a level one Mallat structure. Specifically, as shown in FIG. 3a, a low-pass component, "low low", is generated and consists of a 2K×2K sub-image. The 2K×2K sub-image is labeled in FIG. 3a as 305. The high-pass components, consisting of "low high", "high high", and "high low", contain physical coefficient coordinates (e.g., the upper right hand coordinate for the rectangle that constitutes the "low high" component is (4K, 0)).

FIG. 3a also illustrates a second level decomposition. The second iteration of decomposition processing 125 operates on the low pass (i.e., "low low"), component of the level one data. For the second level, the low-pass component, "low low", consists of a 1K×1K sub-image, as labeled in FIG. 3a. FIG. 3b illustrates level three and level four decompositions for the 4K×4K source image of FIG. 3a. To generate the level three decomposition, decomposition processing 125 operates on the level two "low low" component (i.e., the 1K×1K image). For the level three transform, the low-pass component, "low low", is a 512×512 sub-image as labeled on FIG. 3a. FIG. 3b also illustrates a fourth level of decomposition for the 4K×4K source image. For the level four transform, the low-pass component comprises a sub-image of 256×256 pixels.

In one embodiment, the wavelet kernel utilized is derived from D. LeGall and A. Tabatabai, (See "Sub-band coding of digital images using symmetric short kernel filters and arithmetic coding techniques," IEEE International Conference on Acoustics, Speech and Signal Processing, New York, N.Y., pp. 761–765, 1988). Any sub-band kernel or pyramid transform could be used within the infrastructure described by dynamic transfer syntax; however, an integer kernel with no coefficient growth in the low pass term has particular advantages in that the low pass coefficients can be used without processing as pixels, and the transform can be inverted exactly in the integer domain. Although floating point kernels can have superior signal transfer characteristics, the additional processing required to use these coefficients as pixels, and the need for additional storage to guarantee perfect reconstruction works to their disadvantage.

The kernel consists of a low pass and a high pass biorthogonal filter. With input defined as $\{d_j\}$ and [x] defined as the floor function, the forward transform is:

Low[$j$]=[($d_{2j}$+$d_{2j}$+1)/2]

High[2]=$d_{2j}$-$d_{2j+1}$+Poly[$j$]

Poly[$j$]=[(3*Low[$j$-2]-22*Low[$j$-1]+22*Low[$j$+1]-3*Low[$j$+2]+32)/64]

The inverse transform, used to reconstruct the image, is:

$d_{2j}$=Low[$j$]+[(High[$j$]-Poly[$j$]+1)/2]

$d_{2j+1}$=Low[$j$]-[(High[$j$]-Poly[$j$])/2]

Figure 3C:
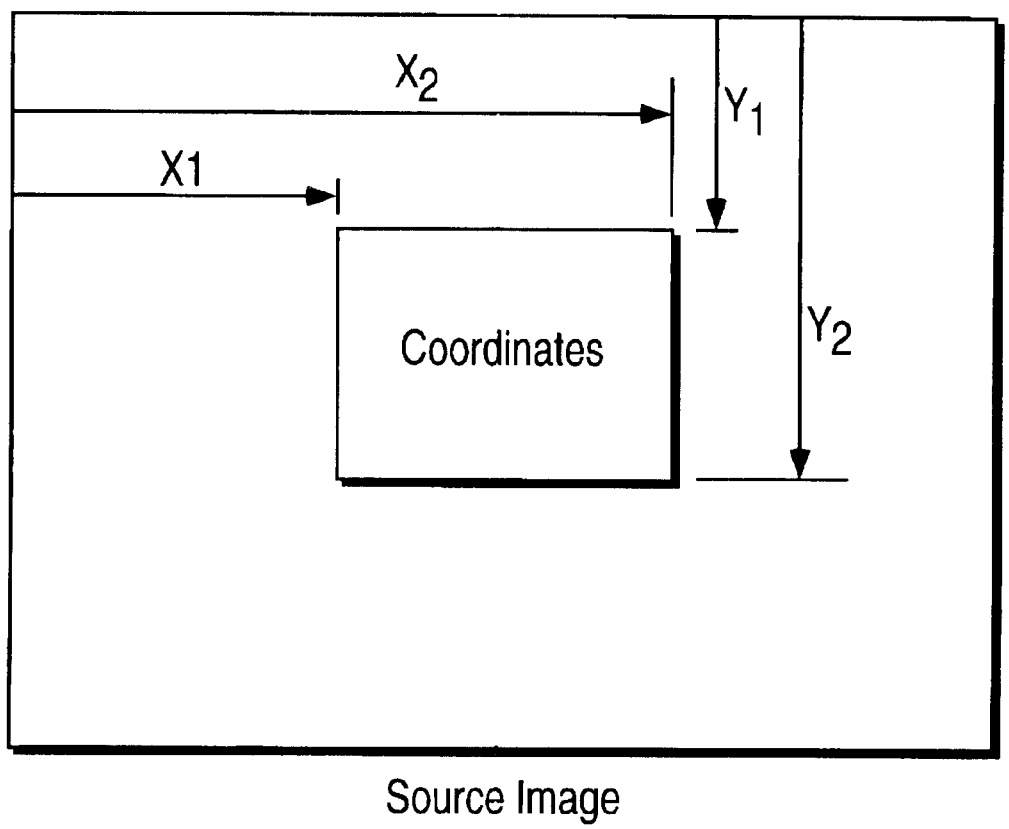
FIG. 3c illustrates one convention for identifying coefficient coordinates of transform data.

As discussed above, the wavelet transform is a spatial transform such that the information is aggregated to preserve the predictability of the geometry of the source image. Thus, coefficient coordinates sufficient to reconstruct a desired image or sub-image at a particular level are readily identifiable. FIG. 3c illustrates one convention for identifying coefficient coordinates of transform data. For purposes of nomenclature, the coefficient coordinates are identified as follows:

[$X_1$, $X_2$][$Y_1$, $Y_2$]$L_C$, where $X_1$, $X_2$ and $Y_1$, $Y_2$, identify the parameters of the coefficient coordinates as shown in FIG. 3c, and $L_C$ identifies the level in the decomposition transform (e.g., "L2" connotes a level 2 transform).

A more complete description of the dynamic transfer syntax is contained in U.S. Provisional Patent Application, entitled "Flexible Representation and Interactive Image Data Delivery Protocol", Ser. No.: 60/091,697, inventors Paul Joseph Chang and Carlos Bentancourt, filed Jul. 3, 1998, and U.S. Patent Application, entitled "Methods and Apparatus for Dynamic Transfer of Image Data", Ser. No.: 09/339,077, inventors Paul Joseph Chang and Carlos Bentancourt, filed Jun. 23, 1999, both of which are expressly incorporated herein by reference.

Image Collaboration Embodiments

Figure 4:
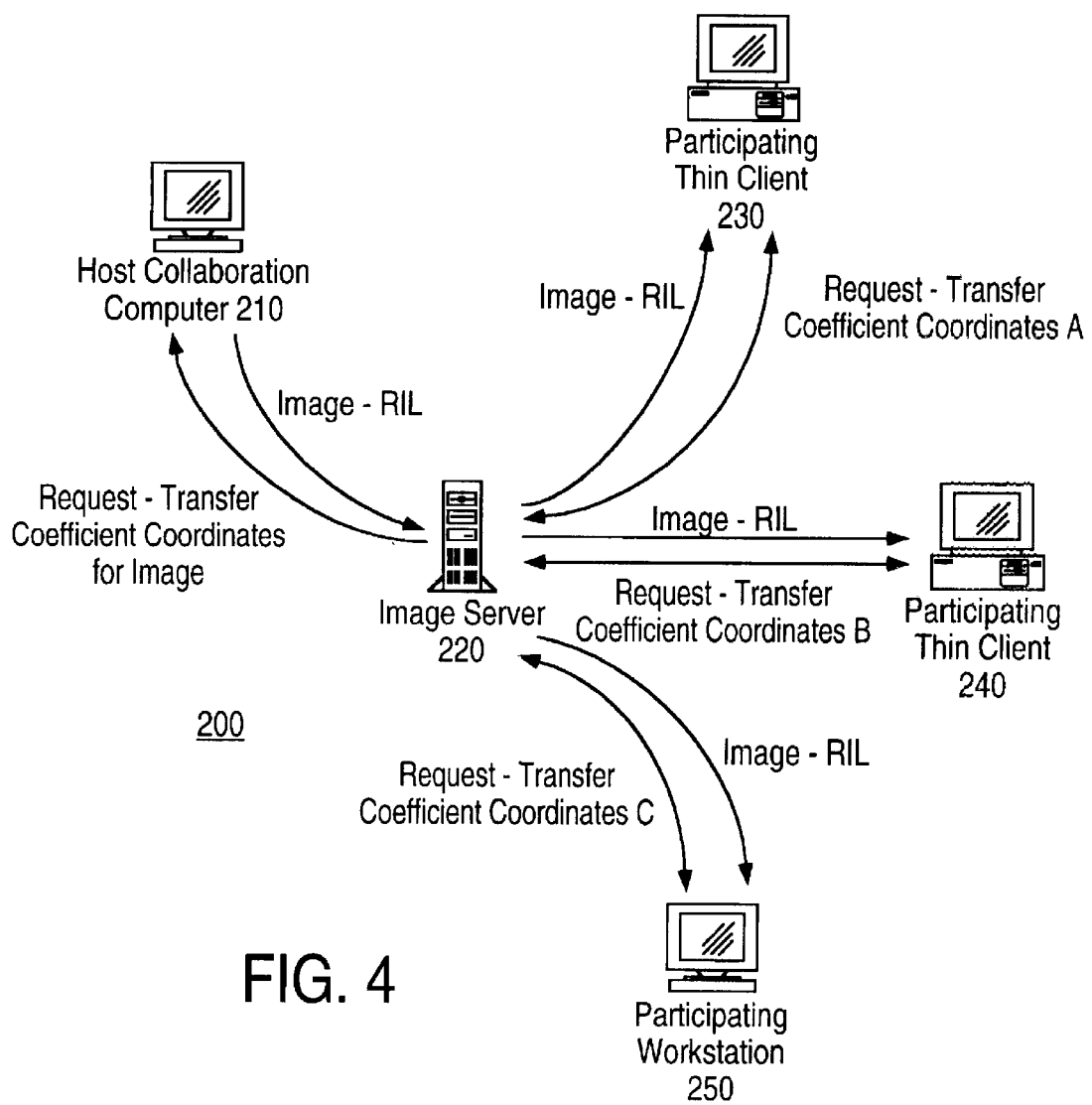
FIG. 4 is a network diagram illustrating one embodiment for implementing image collaboration.
Figure 5:
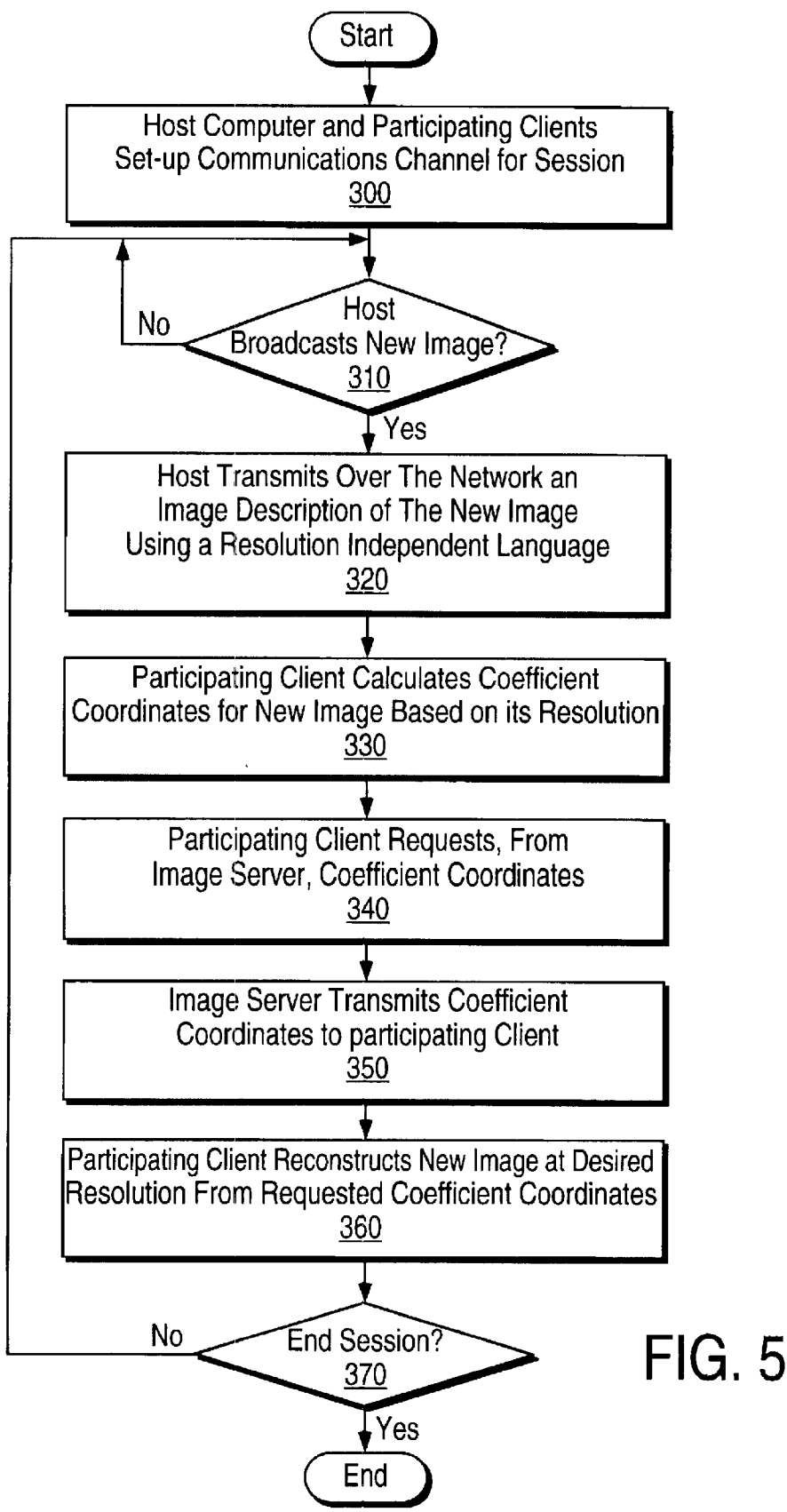
FIG. 5 is a flow diagram illustrating one embodiment for conducting resolution independent image collaboration for the embodiment of FIG. 4.

FIG. 4 is a network diagram illustrating one embodiment for implementing image collaboration. For this embodiment, a host collaboration computer 210 conducts an image collaboration session with participating thin client's 230 and 240, as well as a participating workstation 250. FIG. 5 is a flow diagram illustrating one embodiment for conducting resolution independent image collaboration for the embodiment of FIG. 4. Initially, the host computer 210 and participating clients (230, 240 and 250) set-up a communications channel for the collaboration session (block 300, FIG. 5). In one embodiment, the image collaboration system utilizes communication resources of the Common Object Request Broker Architecture ("CORBA"). For this embodiment, the host computer 210 generates an event channel, and the participating clients subscribe to that event channel. Thereafter, the events are broadcasted by the host computer 210 on the event channel, the participating clients receive the events. However, any communication mechanism to set-up communications among multiple computers on a network may be used. For example, the host computer and participating clients may use socket services provided through Unix based operating systems.

For this embodiment, the host collaboration computer 210, (e.g., through the dynamic transfer syntax), requests and subsequently receives from the image server 220 an initial image. The host computer 210 propagates or broadcasts a description of the initial image by generating a resolution independent language ("RIL") description of the image (block 320, FIG. 5). In one embodiment, the resolution independent language describes a center point of the image displayed at the host, as well as the dimensions of the image (number of rows and columns). For this embodiment, these coordinates may be expressed as:

[$(X_0, Y_0)$, (rows and columns), $L$]

where: $X_0$ and $Y_0$ are the center point coordinates of the image; rows and columns defines the number of rows and columns, respectively, displayed at the host computer; and L connotes the level in the hierarchical representation of the dynamic transfer syntax. In one embodiment, this resolution independent description of the rows, columns, and level of the image is relative to a full resolution view of the image at the host computer relative to the source image. Because the description of the image includes a center point of the host computer's context of the image, the description is truly a resolution independent description.

As shown in FIG. 4, the participating clients (230, 240, and 250) receive the resolution independent language description of the image. The participating clients (230, 240, and 250) calculate the necessary transform data, expressed as coefficient coordinates, to render the image at the proper resolution on its display (block 330, FIG. 5). Each participating client then requests, from the image server 220, the calculated coefficient coordinates necessary to render the image at the appropriate resolution (block 340, FIG. 5). The image server 220 transmits the requested transform data at the designated coefficient coordinates to the participating client (block 350, FIG. 5). From the transform data, the participating client constructs the new image at the desire resolution (block 360, FIG. 5). Similarly, for each broadcast of an image from the host collaboration computer 210, steps 320, 330, 340, 350 and 360 are executed, as indicated by the decision blocks 310 and 370.

Figure 6A:
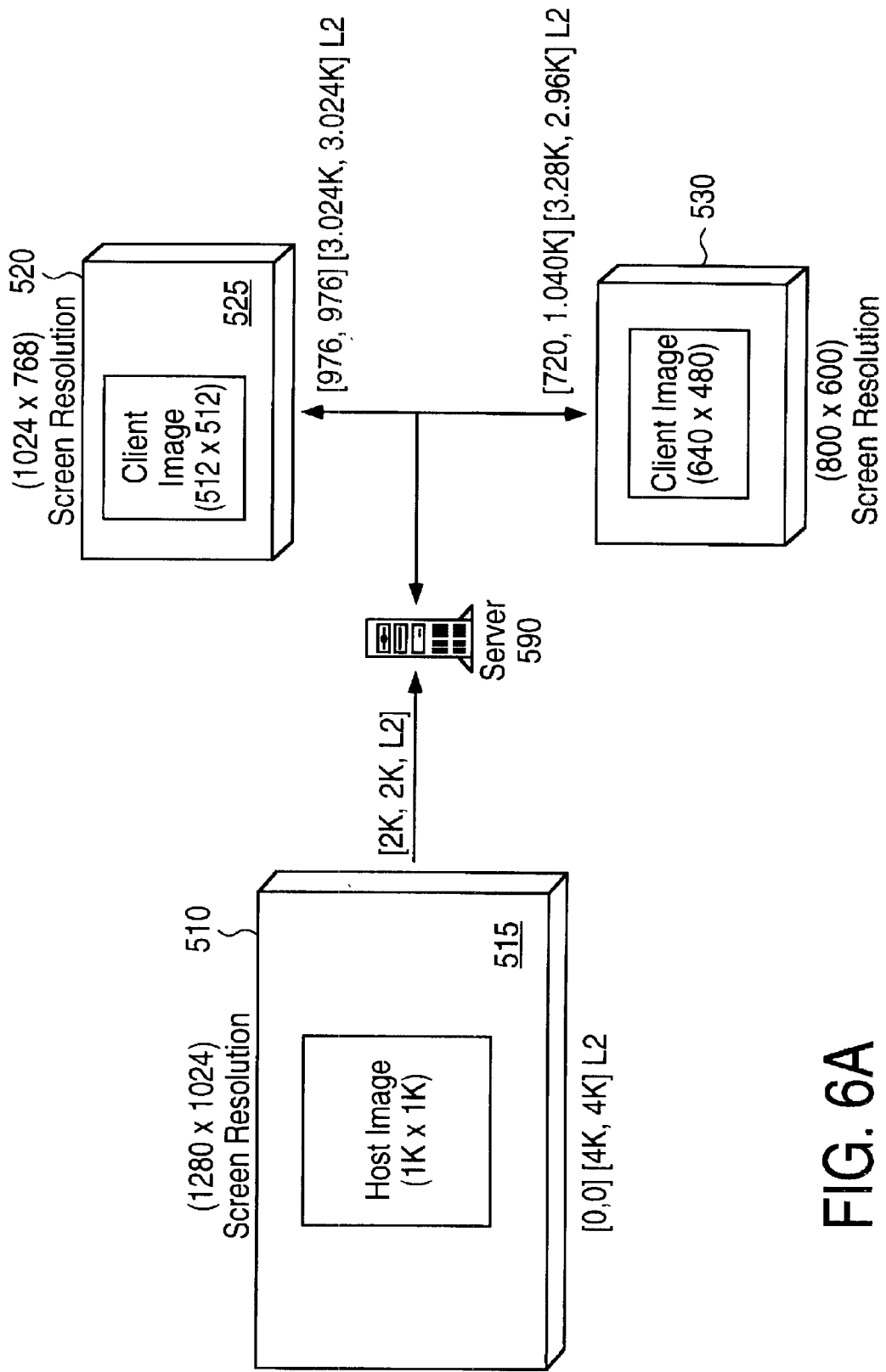
FIGS. 6a and 6b illustrate examples of image collaboration for the embodiments shown in FIGS. 4 and 5.
Figure 6B:
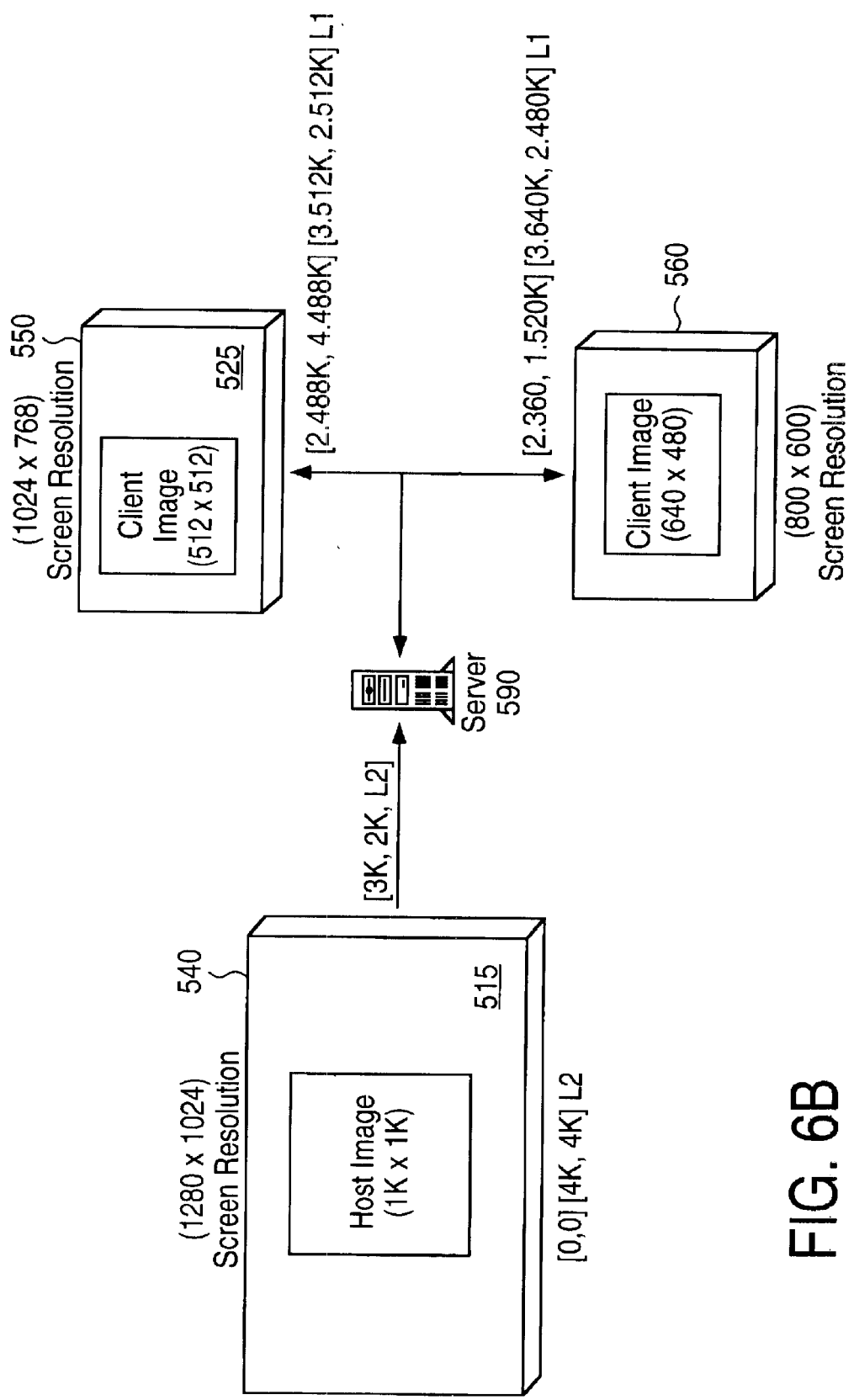

FIGS. 6a and 6b illustrate examples of image collaboration for the embodiments shown in FIGS. 4 and 5. For this example, the host computer 510 comprises a total screen resolution of 1280×1024 pixels. The host image is displayed on display 510 in a 1K×1K window, labeled 515 on FIG. 6a. For this example, the host computer initially displays the full image, depicted in FIG. 4a, at level two Thus, for this example, the host computer requests transform data with coefficient coordinates of [0,0] [4K,4K] L2. This amount of transform data, when reconstructed, is displayed in the 1K×1K window. To conduct image collaboration with the 1K×1K host image, the host computer broadcasts the resolution independent language description of [(2K, 2K), (1K, 1K), L2]. This RIL describes the center point of the [0,0] [4K,4K] L2 image, relative to the hierarchical representation of the source image, as well as the 1K×1K resolution image displayed at the host computer.

The RIL is transmitted to the participating clients 520 and 530. As shown in FIG. 6a, participating client 520 has a total screen resolution of 1024×768, and an active window for use in image collaboration of (512×512). For this example, participating client 520 receives the RIL, [2K, 2K, L2], and requests transform data from the server 540 to reconstruct the host image 515 in a 512×512 window. Specifically, participating client 520 requests transform data consisting of coefficient coordinates [976, 976] [3.024K, 3.024K] L2. Participating clients 530, which consists of a screen resolution of 800×600 and an active window for image collaboration of 640×480, receives the RIL of [2K, 2K, L2]. Similar to participating client 520, participating client 530 requests coefficient coordinates of transform data to reconstruct the host image in the 640×480 window. To this end, participating client 530 requests the coefficient coordinates [720, 1.040K] [3.28K, 2.96K] L2. The participating client 530 reconstructs a portion of the host image 515 in the 640×480 window. Thus, for the embodiment of FIG. 6a, the image collaboration system calculates coefficient coordinates relative to the center point described in the RIL at the same level as the host image. Although in the above example the host contains the largest display size, the participating clients may possess the largest display resolution.

For the example of FIG. 6a, the client image 512×512 consists of only a portion of the host image 515 (i.e., the client image 525 contains approximately ½ of the host image 515). Presumably, the focus of the collaboration is at the center of the host image. Therefore, the client image 525 still contains the portion of the host image that is the subject of the collaboration. However, in alternative embodiments, the client image may consist of the same viewable portion of the host image, but at a lower resolution.

FIG. 5b illustrates a second example for the image collaboration embodiments of FIGS. 2 and 3. For this example, the host zooms in on a specific portion of the source image shown in FIG. 4a. To accomplish this in the dynamic transfer syntax embodiment, the host computer 540 requests from the server transform data defined by the coefficient coordinates [2K, 4K] [2K, 4K] L1. For image collaboration, the host computer 540 broadcasts the RIL of [(3K, 2K) (1K, 1K), L1]. In turn, the client computer 550, using the center point of the RIL [3K, 2K, L1], calculates the coefficient coordinates [2.488K, 4.488K] [3.512K, 2.512K] L1, and requests the transform data at these coefficient coordinates from the server 590. Similarly, for the zoomed in view, participating client 560 requests, from server 590, transform data at the coefficient coordinates [2.360, 1.520K] [3.640K 2.480K] L1, calculated from the center point of the RIL of [3K, 2K, L1].

Figure 7:
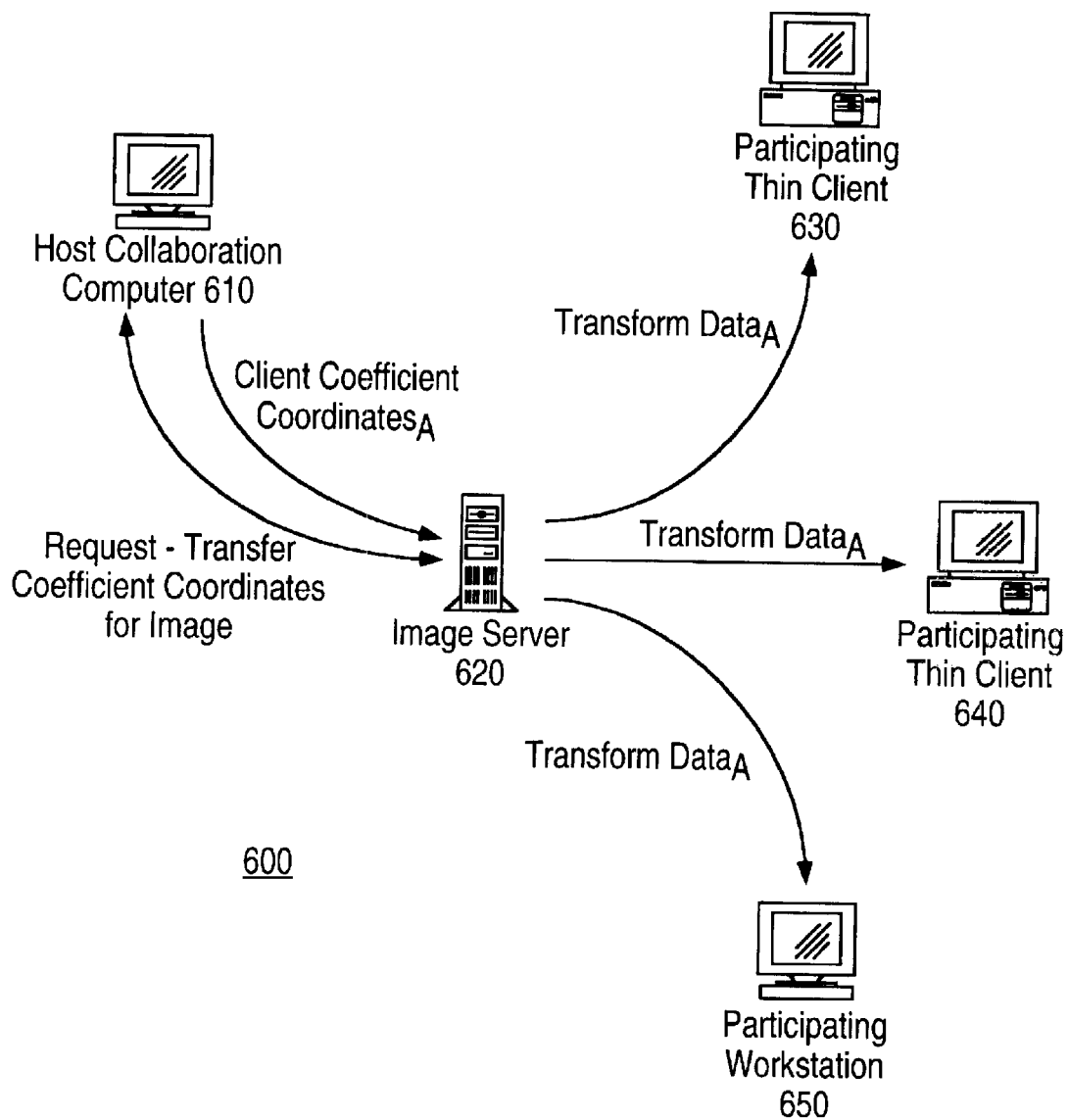
FIG. 7 is a network diagram illustrating another embodiment for the image collaboration system of the present invention.

FIG. 7 is a network diagram illustrating another embodiment for the image collaboration system of the present invention. For this embodiment, the host computer 610 obtains an image through the request—transfer process with the image server 620. To broadcast the image at the host computer 610, the host computer 610 transmits, to the image server 620, a single set of client coefficient coordinates. In one embodiment, the single set of client coefficient coordinates comprise coordinates sufficient to reconstruct an image at the participating client with the largest display resolution. For example, in FIG. 7, if the participating workstation 650 contains the largest image display, then host computer 610 requests coefficient coordinates sufficient to display the image at the participating workstation 650. As discussed above, due to the properties of the dynamic transfer syntax, the other participating clients (e.g., participating clients 630 and 640) may render the image at their respective resolutions because the transform data necessary to reconstruct the image at their respective resolutions is a subset of the transform data necessary to render the image at the participating workstation 650. The transmission of a single set of client coefficient coordinates, and the subsequent transfer of a single set of transform data, is illustrated in FIG. 7 as client coefficient coordinates$_A$ and transform data$_A$. Also, the host computer does not necessarily possess the largest display resolution.

Figure 8:
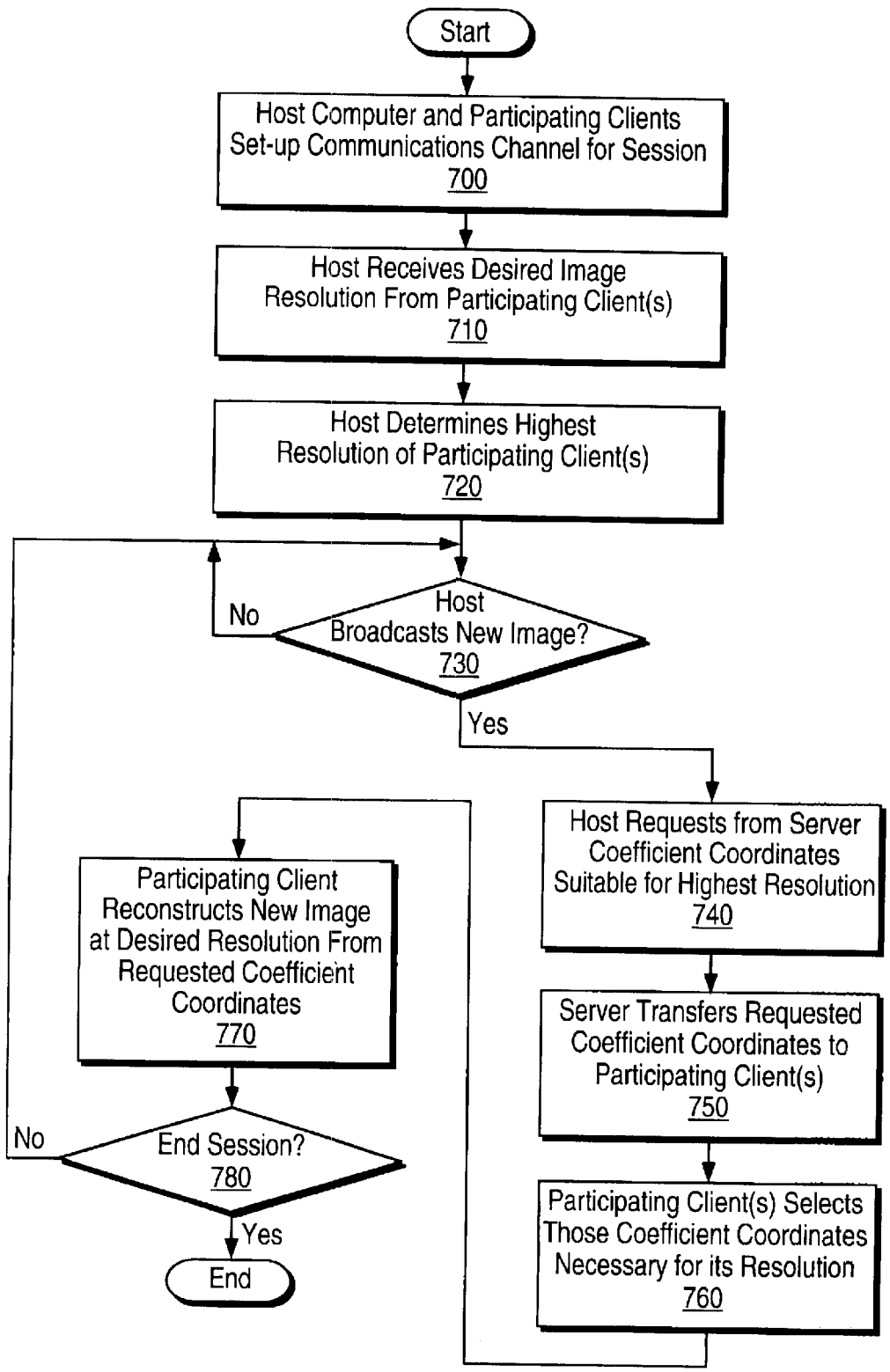
FIG. 8 is a flow diagram illustrating the image collaboration embodiment of FIG. 7.

FIG. 8 is a flow diagram illustrating the image collaboration embodiment of FIG. 7. To conduct an image collaboration session, the host computer and participating clients set-up communications channels for the session (block 700, FIG. 8). The host computer, through the communications channel, receives the resolution at which each participating client will render images for the collaboration session (block 710, FIG. 8). For example, if a participating client utilizes a 640×480 window to display images for the collaboration session, then the client transmits information to the host computer to identify its resolution as 640×480. The host computer then determines the highest resolution of the participating clients (block 720, FIG. 8). For example, if there are two participating clients, one with a window resolution of 512×480 and the second with a resolution of 640×480, then the host selects the screen resolution of 640×480 as the largest resolution for a participating client (see FIG. 8).

When the host broadcasts a new image, the host requests from the image server the coefficient coordinates suitable for the highest resolution participating client (blocks 730 and 740, FIG. 8). In the previous example, the host computer requests coefficient coordinates suitable to render the image in the 640×480 window. In response for the request for transform data, the image server transfers the image data identified by the requested coefficients coordinates to the participating clients (block 750, FIG. 8). The participating clients reconstruct the image at its respective resolution from the transform data or a subset of the transform data (block 770, FIG. 8). For each additional image broadcasted by the host computer, the process involves execution of blocks 740, 750, 760 and 770. The process ends at the end of a session (block 780, FIG. 8).

Figure 9:
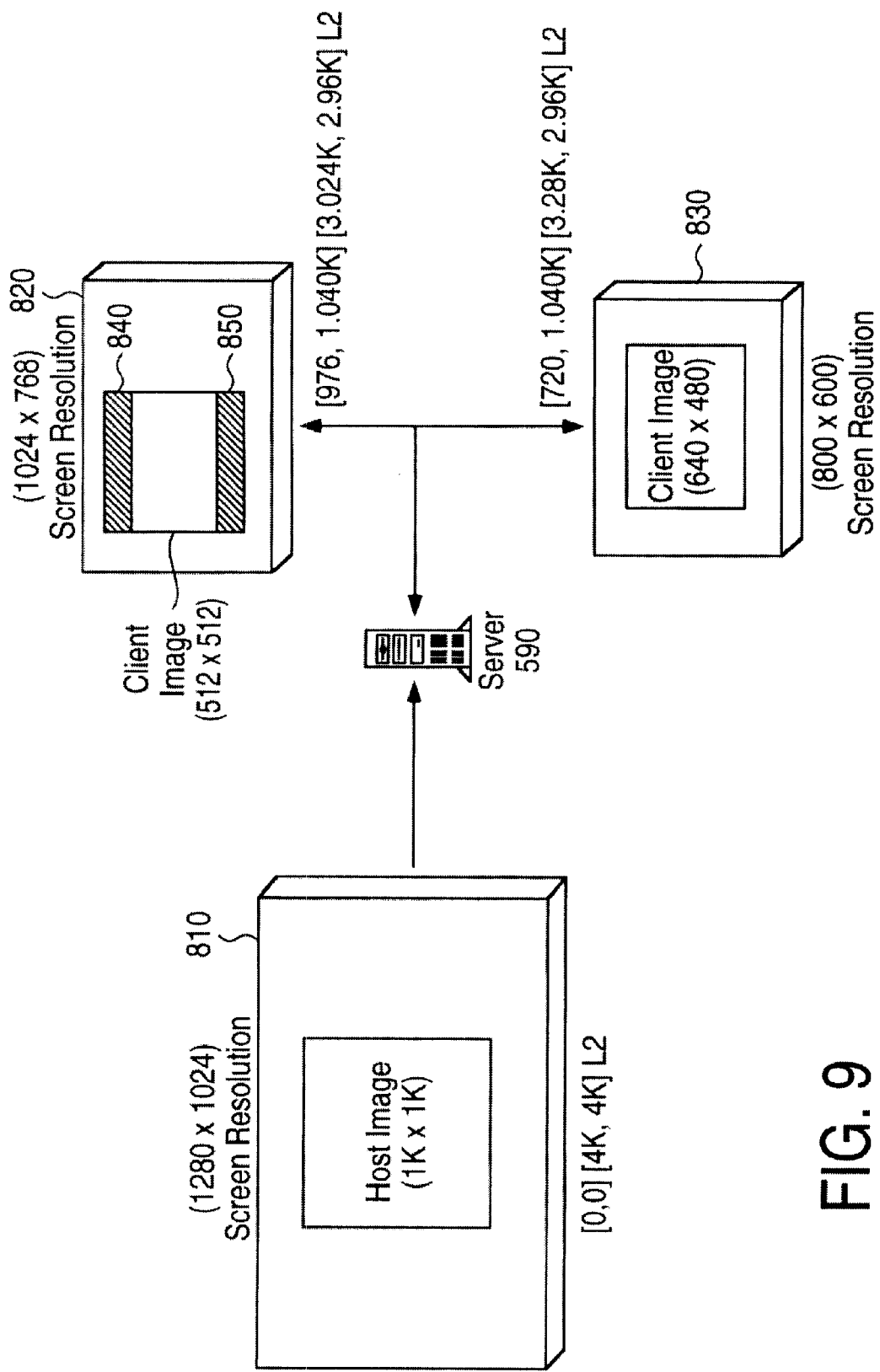
FIG. 9 illustrates an example of image collaboration for the embodiments shown in FIGS. 7 and 8.

FIG. 9 illustrates an example of image collaboration for the embodiments shown in FIGS. 7 and 8. For the example of FIG. 9, the host computer, with the screen resolution of 1280×1024, contains a 1K×1K window for image collaboration. Also, for this example, the initial image is derived from the source image depicted in FIG. 3a, and is defined by the coefficient coordinates [0,0] [4K, 4K] L2. To collaborate over this initial image, the host 810 transmits coefficient coordinates to the server sufficient to render the initial image on the largest display with a resolution of 640×480. Specifically, the host 810 transfers to the image server the coefficient coordinates [720, 1.040K] [3.28K, 2.96K] L2. These coefficient coordinates define transform data of the source image necessary to render the initial image on a display resolution of the 640×480 (i.e., to render the image at participating client 830).

The participating client 820, with a window resolution of 512×512, requires coefficient coordinates that are a subset of the coefficient coordinates used to render the image on the 640×480 window. Specifically, participating client 820 requires transform data defined by the coefficient coordinates [976, 1.040K] [3.024K, 2.96K] L2 to reconstruct at least a portion of the initial image on the 512×512 window. Note that the [976, 1.040K] [3.024K, 2.96K] L2 coefficient coordinates are a subset of the coefficient coordinates [720, 1.040K] [3.28K, 2.96K] L2.

The example shown in FIG. 9 illustrates the problem of rendering images in participating clients with different aspect-ratios. Although participating client 830 has a larger resolution than participating client 820, their aspect ratios of the image are different. Therefore, when rendering the 512×512 image from a subset of the coefficient coordinates from participating client 830, a portion of the 512×512 does not contain the image. For the example of FIG. 9, areas 840 and 850 depict the area of the image not rendered.

The image collaboration system permits switching of the "host" during a collaboration session. In one embodiment, a user of a participating client, who desires to become a host of the collaboration, generates, through the user interface, a request. In response, the participating client computer queries the host computer to relinquish control as the host of the collaboration. For the embodiment that uses CORBA communication services, the participating client transmits a pre-defined event to the host. The host computer receives the event, and relays the request to switch the host of the collaboration to the user of the host computer. The host computer then acknowledges the transfer of the host by ceasing to broadcast further events, and by sending, to the requesting participating client computer, an event that relinquishes control of the collaboration to the requesting participating client computer. The requesting participating client computer becomes the host computer. Also, in one embodiment, the name of the person conducting the collaboration (i.e., user of the host computer) is displayed on the user interface of the host and participating client computers.

In one embodiment, the image collaboration system contains the capability to store a "chronicle" of the collaboration session. In general, the chronicle records information about all images broadcast during an image collaboration session. For example, in a medical application, if physicians collaborate about five X-rays for a patient, then the chronicle records a reference of those five images displayed during the image collaboration session. In one embodiment using the dynamic transfer syntax, the server records a reference to the source image, used as a basis for the image collaboration, and records the sets of coefficient coordinates used to render the image on the host computer. Alternatively, any means may be used to record the image is broadcast during an image collaboration session.

Broadcasting The User Interface Context Of The Host

Figure 10:
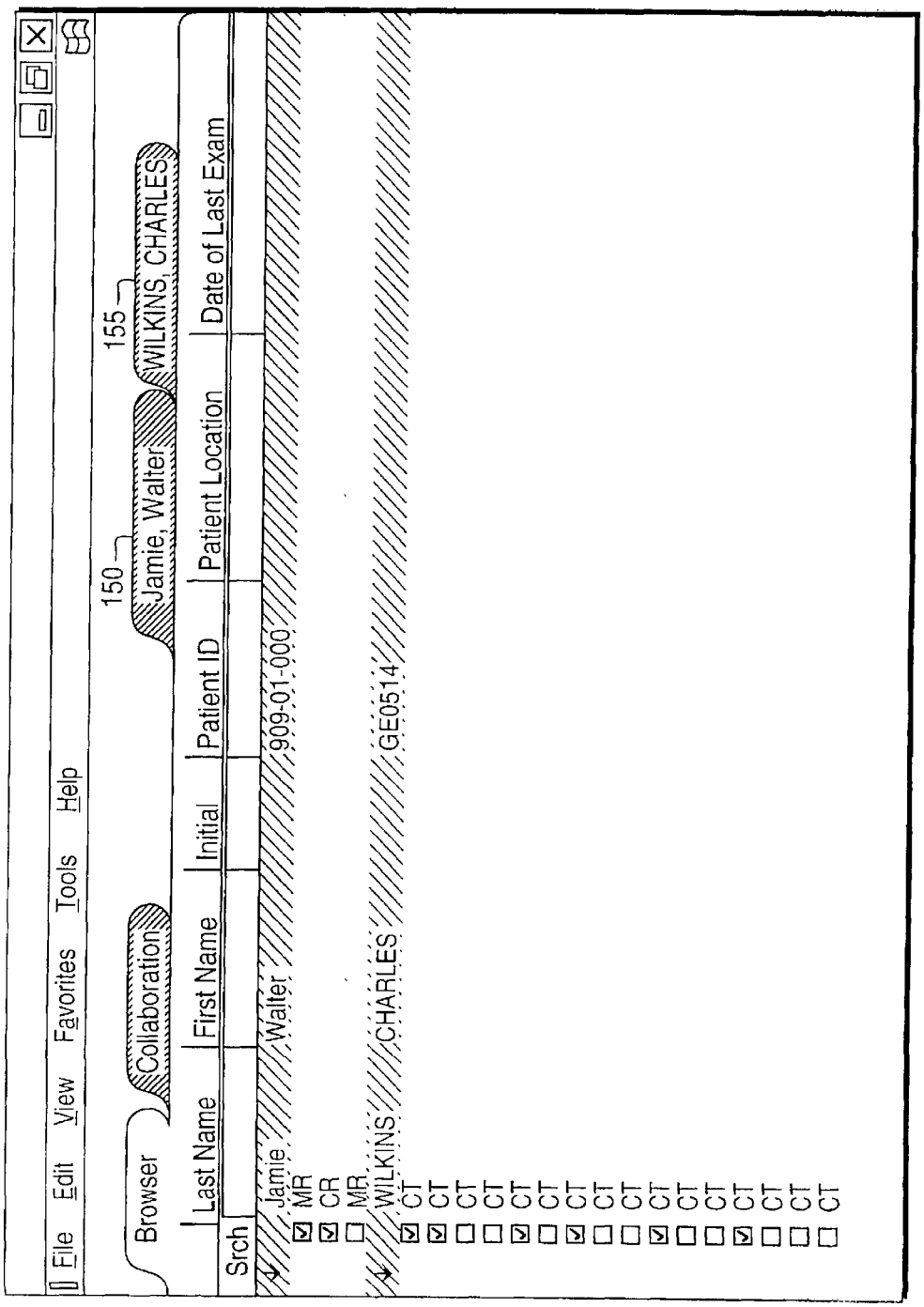
FIG. 10 illustrates one embodiment for a patient browser view of a user interface for use in a medical informatics collaboration system.

In one embodiment, in addition to broadcasting the context of the source image displayed at the host, the image collaboration system broadcasts the entire user interface context of the host. The image collaboration system has application for use in medical informatics. In one embodiment for a medical informatics collaboration system, the user interface allows a user to select studies, which consist of medical images/series, for patients. For this embodiment, this functionality is provided through a patient browser view. FIG. 10 illustrates one embodiment for a patient browser view of a user interface for use in a medical informatics collaboration system. The host computer of the collaboration, after selecting studies, may broadcast the studies selected for use in the collaboration session. Thus, the participating clients also receive the host's patient browser view, to obtain a context for the collaboration session.

The user interface for the medical informatics system also permits a user to organize the studies as well as the images/series within the studies, including resizing the studies and the images/series within a study. The user may also navigate around the images/series. Specifically, the user has the ability to pan and zoom images to view portions of an image at various resolutions. Furthermore, the user of the user interface may analyze the image by selecting to view the image in detail in a large floating window. In one embodiment, the organization, navigation, and analysis of studies and images/series are performed through a patient canvas view.

Figure 11:
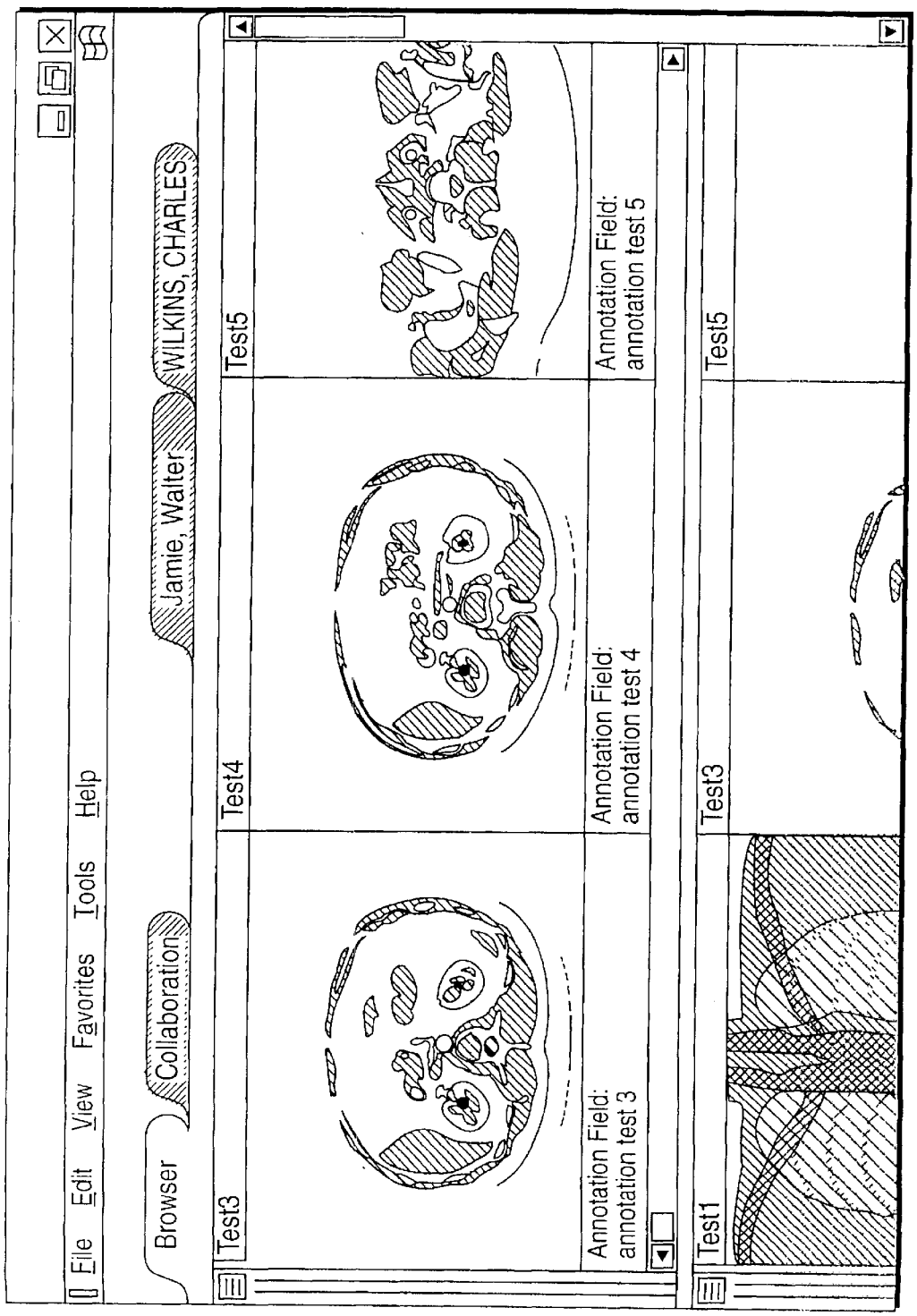
FIG. 11 illustrates one embodiment for a patient canvas view for use in a medical informatics collaboration system.

FIG. 11 illustrates one embodiment for a patient canvas view for use in a medical informatics collaboration system. In general, the patient canvas view of the user interface permits a user to organize and size the studies selected. As shown in FIG. 11, a patient canvas view 200 includes a plurality of studies for the selected patient, "Jamie, Walter." The patient tab, labeled 150 for "Jamie, Walter" is highlighted. Each tab displayed has a corresponding patient canvas view. Thus, another patient canvas view exists for the patient "Charles Wilkins."

The area beneath the displayed tabs is the primary display area for the studies and series/images. For the example of FIG. 11, two studies, arranged horizontally across the screen, are shown. In one embodiment, selected studies are automatically laid out from top to bottom on the patient canvas view. Each study is broken out left to right into one or more series for CT/MR and one or more images for CD/DR. In the example of FIG. 11, the first or top study includes the series of images labeled 230, 235 and 240 on FIG. 11. The second study, displayed on the bottom of the patient canvas view, currently displays the three images: 260, 265, and 270.

In one embodiment, the patient canvas view is displayed in a standard orientation such that each horizontal scroll bar (scroll bar 110 for the top study) contains a study. The user, using the horizontal scroll bar (e.g., horizontal scroll bar 110), is permitted to scroll left and right to display the series/images contained within the study. Also, a single vertical scroll bar (e.g., vertical scroll bar 205 on FIG. 11) is provided to permit the user to scroll, in a vertical direction (i.e., from top to bottom), to display multiple studies. Furthermore, the height of each study may be varied within the patient canvas view. To accomplish this operation, the user, using a cursor control device, places the cursor on a horizontal grab bar on the study (e.g., bar 290 for the top study and bar 295 for the bottom study), and resizes the study to the appropriate height. Using this technique, the studies (i.e., the window encompassing the studies), may be re-sized to any user-desired size.

Using the user interface, the user may organize studies by re-arranging the relative vertical positions among the studies. The user may also use the features of the patient canvas view to organize images, within a study, by re-arranging the relative horizontal positions among the images/series within a study. In one embodiment, these organization operations are executed via a drag and drop operation. As is well known, in a drag and drop operation, the user "selects" a series/image or study, and drags the series/image or study to the destination location. When the image is located at the destination location, the user releases the series/image or study to complete the drag and drop operation. A control "hot area" at the left date of each study row is displayed to provide a handle for the user to grab the study in the drag and drop operation. The study "handle" is labeled 275 for the top study and is labeled 280 for the bottom study of the FIG. 11. The series (CT/MR) and images (CR/DR) may also be re-arranged within a study (i.e., rearrange relative horizontal positions) using the drag and drop operation. For this operation, the user may "grab" an image or series using the title bar or annotation area, such as title bar 220 for series 235 on FIG. 11. The drag and drop operation provides maximum flexibility for the user to arrange the patient canvas view in any manner desired by the user.

As discussed above, the user interface for the medical informatics collaboration system provides maximum flexibility for the host to arrange images on the display. In one embodiment, the context for the images, as displayed on the host computer's user interface (e.g., the arrangement of images, the relative sizing, tabs displayed, etc.) are broadcasted to the participating clients. In this way, the participating clients receive the entire patient canvas view of the host. This maximizes the effect that the client participants are viewing the same display as the host.

One embodiment for implementing a user interface for use in collaboration is described in U.S. patent application Ser. No. 09/449,115 entitled "User Interface for a Medical Informatics System", inventors, Paul Joseph Chang M. D., Bradford V. Hebert, and Ben McCurtain, filed concurrently herewith [Express Mail Label No.: EL497530676US], and is expressly incorporated herein by reference.

Although the present invention has been described in terms of specific exemplary embodiments, it will be appreciated that various modifications and alterations might be made by those skilled in the art without departing from the spirit and scope of the invention.

What is claimed is:

1. A method for conducting image collaboration among a host computer and at least one client computer, the method comprising the steps of:

a) storing transform data of a source image so as to permit construction from the transform data of at least portions of the source image at different resolutions;

b) displaying, at a first resolution on the host computer, a first display image constructed from the transform data of the source image;

c) generating a resolution independent description of the first display image that describes the first display image relative to the transform data of the source image;

d) broadcasting the resolution independent description of the first display image to at least one client computer;

e) determining at the client computer, from the resolution independent description of the first display image, select portions of the transform data of the source image necessary to display a second display image at a second resolution, different than the first resolution;

f) reconstructing the second display image at the client computer from the select portions of the transform data of the source image; and g) displaying at the client computer the second display image in the second resolutions.

2. The method as set forth in claim 1, wherein:
the step of generating a resolution independent description of the first display image comprises the step of generating a description of a center point of the first display image relative to the source image; and
the step of generating a second display image comprises the step of determining from the center point select portions of the source image necessary to construct the second display image at the second resolution.

3. The method as set forth in claim 1, wherein
the step of generating a resolution independent description of the first display image comprises the step of identifying select portions of the transform data of the source image to construct at least a portion of the first display image at the second resolution; and
the step of generating a second display image comprises the step of reconstructing the second display image of the transform data from the select portions of the source image.

4. The method as set forth in claim 1, wherein:
the step of storing a source image comprises the steps of:
generating transform data from a spatial transform defined by a set of coefficient coordinates, such that the source image and portions of the source image are reconstructed from a set of coefficient coordinates; and
storing the transform data to represent the source image;
the step of generating a resolution independent description of the image comprises the step of describing the first display image using a first set of coefficient coordinates;
the step of generating a second display image comprises the steps of:
defining a second set of coefficient coordinates for the second display image necessary to reconstruct at least a portion of the first display image at the second resolution;
receiving, at the client computer, the second set of coefficient coordinates;
reconstructing the second display image at the client computer from the second set of coefficient coordinates.

5. The method as set forth in claim 4, wherein:
the step of generating transform data from a spatial transform further comprises the step of generating the transform data to transform the source image into a hierarchical representation of a plurality of levels, wherein a level of the hierarchical representation comprises transform data sufficient to reconstruct the source data at a resolution corresponding to the level; and
the step of defining a second set of coefficient coordinates for the second display image comprises the step of specifying coefficient coordinates at a level necessary to reconstruct the second display image at the second resolution.

6. The method as set forth in claim 1, further comprising the steps of:
displaying, on the host computer, a new first display image comprising at least a portion of the source image; and
repeating steps c, d, e, f and g for the new first display image to generate a new second display image.

7. The method as set forth in claim 6, further comprising the step of generating a chronicle of images displayed at the host computer and the client computers.

8. The method as set forth in claim 1, wherein the source image comprises a medical image.

9. A method for image collaboration among a host computer and at least one client computer, the method comprising the steps of:
generating transform data, defined by a plurality of coefficient coordinates, to transform a source image into a hierarchical representation comprising a plurality of levels, wherein a level of the hierarchical representation comprises transform data sufficient to reconstruct the source data at a resolution corresponding to the level;
generating, from the transform data of the source image, a first display image at a first resolution defined by a first set of coefficient coordinates;
displaying on the host computer the first display image;
generating a resolution independent description of the first display image from at least a portion of the first set of coefficient coordinates;
transmitting, from the host computer to the client computer, the resolution independent description of the first display image;
generating from the resolution independent description a second set of coefficient coordinates to define a second display image comprising a second resolution, different from the first resolution, wherein the second display image comprises at least a portion of the first display image; and
displaying at the client computer the second display image,
whereby display of the image at the first resolution at the host computer and display of the at least a portion of the image at the second resolution permits image collaboration independent of display resolution.

10. A computer readable medium comprising a plurality of instructions, which when executed by a computer, causes the computer to perform the steps of:
a) storing transform data of a source image so as to permit construction from the transform data of at least portions of the source image at different resolutions;
b) displaying, at a first resolution on the host computer, a first display image constructed from the transform data of the source image;
c) generating a resolution independent description of the first display image that describes the first display image relative to the transform data of the source image;
d) broadcasting the resolution independent description of the first display image to at least one client computer;
e) determining at the client computer, from the resolution independent description of the first display image, select portions of the transform data of the source image necessary to display a second display image at a second resolution, different than the first resolution;
f) reconstructing the second display image at the client computer from the select portions of the transform data of the source image; and
g) displaying at the client computer the second display image in the second resolution.

11. The computer readable medium as set forth in claim 10, wherein:
the step of generating a resolution independent description of the first display image comprises the step of generating a description of a center point of the first display image relative to the source image; and the step of generating a second display image comprises the step of determining from the center point select portions of the source image necessary to construct the second display image at the second resolution.

12. The computer readable medium as set forth in claim 10, wherein the step of generating a resolution independent description of the first display image comprises the step of identifying select portions of the transform data of the source image to construct at least a portion of the first display image at the second resolution; and the step of generating a second display image comprises the step of reconstructing the second display image of the transform data from the select portions of the source image.

13. The computer readable medium as set forth in claim 10, wherein:

the step of storing a source image comprises the steps of:
generating transform data from a spatial transform defined by a set of coefficient coordinates, such that the source image and portions of the source image are reconstructed from a set of coefficient coordinates; and
storing the transform data to represent the source image;

the step of generating a resolution independent description of the image comprises the step of describing the first display image using a first set of coefficient coordinates;

the step of generating a second display image comprises the steps of:
defining a second set of coefficient coordinates for the second display image necessary to reconstruct at least a portion of the first display image at the second resolution;

receiving, at the client computer, the second set of coefficient coordinates;
reconstructing the second display image at the client computer from the second set of coefficient coordinates.

14. The computer readable medium as set forth in claim 13, wherein:

the step of generating transform data from a spatial transform further comprises the step of generating the transform data to transform the source image into a hierarchical representation of a plurality of levels, wherein a level of the hierarchical representation comprises transform data sufficient to reconstruct the source data at a resolution corresponding to the level; and the step of defining a second set of coefficient coordinates for the second display image comprises the step of specifying coefficient coordinates at a level necessary to reconstruct the second display image at the second resolution.

15. The computer readable medium as set forth in claim 10, further comprising the steps of:

displaying, on the host computer, a new first display image comprising at least a portion of the source image; and repeating steps c, d, e, and f for the new first display image to generate a new second display image.

16. The computer readable medium as set forth in claim 10, further comprising the steps of:

displaying, on the host computer, a new first display image comprising at least a portion of the source image; and repeating steps c, d, e, f and g for the new first display image to generate a new second display image.

17. The computer readable medium as set forth in claim 11, wherein the source image comprises a medical image.

* * * * *